(12) United States Patent
Henry et al.

(10) Patent No.: US 12,246,337 B2
(45) Date of Patent: Mar. 11, 2025

(54) PORTABLE GRANULAR PARTICLE SPREADER

(71) Applicant: Charles William Henry, Mt. Joy, PA (US)

(72) Inventors: Charles William Henry, Mt. Joy, PA (US); Keith Zimmerman, Leesport, PA (US)

(73) Assignee: Charles William Henry, Mt. Joy, PA (US)

( * ) Notice: Subject to any disclaimer, the term of this patent is extended or adjusted under 35 U.S.C. 154(b) by 446 days.

(21) Appl. No.: 17/454,264

(22) Filed: Nov. 10, 2021

(65) Prior Publication Data
US 2023/0149956 A1 May 18, 2023

(51) Int. Cl.
*B05B 7/14* (2006.01)
*A01C 7/02* (2006.01)
*A01C 15/02* (2006.01)
*A01C 15/04* (2006.01)
*A01M 9/00* (2006.01)

(52) U.S. Cl.
CPC .............. *B05B 7/1427* (2013.01); *A01C 7/02* (2013.01); *A01C 15/02* (2013.01); *A01C 15/04* (2013.01); *A01M 9/0046* (2013.01)

(58) Field of Classification Search
CPC .................................................... B05B 7/1427
USPC ................................ 222/175, 367; 239/653
See application file for complete search history.

(56) References Cited

U.S. PATENT DOCUMENTS

| | | | | |
|---|---|---|---|---|
| 1,823,905 A | * | 9/1931 | Kreutzberg | B65G 65/00 222/367 |
| 2,152,632 A | * | 4/1939 | Cassiere | B65G 53/4633 406/67 |
| 2,740,230 A | * | 4/1956 | Clapper | B05B 7/1427 239/653 |
| 2,892,286 A | * | 6/1959 | Martin | A01M 9/0061 222/323 |
| 3,403,942 A | * | 10/1968 | Farnworth | B65G 53/4633 406/65 |

(Continued)

FOREIGN PATENT DOCUMENTS

| | | | |
|---|---|---|---|
| WO | 2008043191 A1 | 4/2008 | |
| WO | WO-2010109498 A1 * | 9/2010 | ............ A01C 15/02 |

*Primary Examiner* — Paul R Durand
*Assistant Examiner* — Michael J. Melaragno
(74) *Attorney, Agent, or Firm* — Saxton & Stump, LLC (57) ABSTRACT

A portable granular material spreader including an enclosure adapted to dispense granular material through an outlet, and a pressurized air source. A chamber has first, second, and third passageways, and containing a distributor therein, the first passageway in fluid communication with the outlet to receive the granular material by virtue of gravity from the outlet with the distributor controlling a flow rate of the granular material in the chamber, the second passageway in fluid communication with the pressurized air source, and the third passageway for discharging the granular material entrained in pressurized air from the pressurized air source. A conduit being in fluid communication with the second passageway and the enclosure, the conduit end being sufficiently distal from the outlet to not result in aerating the granular material proximate the outlet while preventing a reverse flow of the granular material at the outlet during operation of the spreader.

20 Claims, 7 Drawing Sheets

(56) References Cited

U.S. PATENT DOCUMENTS

| | | | | |
|---|---|---|---|---|
| 3,449,016 A | * | 6/1969 | Knowles | B05B 7/1427 |
| | | | | 137/893 |
| 3,586,238 A | * | 6/1971 | Schmierer | B05B 7/2475 |
| | | | | 239/153 |
| 3,593,891 A | * | 7/1971 | Kidd | B65G 53/4633 |
| | | | | 406/65 |
| 3,895,745 A | * | 7/1975 | Hook | G01F 11/24 |
| | | | | 128/203.15 |
| 3,999,690 A | * | 12/1976 | Deckler | A01C 7/046 |
| | | | | 406/64 |
| 4,179,043 A | * | 12/1979 | Fischer | G01F 11/24 |
| | | | | 222/368 |
| 4,474,327 A | | 10/1984 | Mattson et al. | |
| 4,567,998 A | * | 2/1986 | Cole | A01F 15/0816 |
| | | | | 222/533 |
| 4,600,129 A | * | 7/1986 | Kondo | B05B 7/2424 |
| | | | | 239/153 |
| 5,119,993 A | | 6/1992 | Gunzel, Jr. et al. | |
| 5,190,225 A | * | 3/1993 | Williams | A01C 15/04 |
| | | | | 239/653 |
| 5,725,332 A | * | 3/1998 | Harper | B65G 53/4633 |
| | | | | 406/67 |
| 5,944,264 A | * | 8/1999 | Truax | A01C 7/02 |
| | | | | 239/152 |
| 6,575,695 B1 | * | 6/2003 | Miyamoto | B05B 7/1427 |
| | | | | 415/206 |
| 8,066,206 B1 | | 11/2011 | Cotham | |
| 8,104,648 B2 | | 1/2012 | Restive et al. | |
| 10,830,361 B1 | | 11/2020 | Wu | |
| 2002/0067995 A1 | * | 6/2002 | Cifarelli | B05B 7/2475 |
| | | | | 417/234 |
| 2002/0176787 A1 | * | 11/2002 | Cifarelli | B05B 7/2475 |
| | | | | 417/366 |
| 2005/0269369 A1 | * | 12/2005 | Pfeiffer | B65G 53/4633 |
| | | | | 222/367 |
| 2007/0138211 A1 | * | 6/2007 | O'Leary | B65G 53/4633 |
| | | | | 222/368 |
| 2011/0289718 A1 | * | 12/2011 | Basenberg, Jr. | A45F 3/14 |
| | | | | 15/327.5 |
| 2014/0044495 A1 | * | 2/2014 | Kirchhoff | B65G 53/4633 |
| | | | | 406/100 |
| 2016/0305438 A1 | * | 10/2016 | Yamamoto | F04D 25/0613 |
| 2016/0345488 A1 | | 12/2016 | Reitzel | |
| 2019/0200513 A1 | * | 7/2019 | Wu | A01C 17/008 |
| 2020/0107496 A1 | | 4/2020 | Gray et al. | |
| 2023/0149956 A1 | * | 5/2023 | Henry | A01C 15/02 |
| | | | | 239/143 |

* cited by examiner

PORTABLE GRANULAR PARTICLE SPREADER

FIELD OF THE INVENTION

The present invention is directed to granular particle spreaders, and more particularly, to portable granular particle spreaders.

BACKGROUND OF THE INVENTION

Spreaders are commonly used to spread granular particles or material such as seed, weed control pre-emergent, or fertilizer as part of a lawn care, vegetable farming, gardening, and the like. One conventional spreader includes an open hopper for receiving the granular material extending to a handle at the base of the hopper that is adapted to be secured in the grasp of one hand of an operator. The operator's other hand is then required to turn a crank in order to urge a distributor into rotational movement to laterally dispense the granular material from the spreader onto the lawn. Unfortunately, such an arrangement is inefficient, as the hopper size must be small to permit the operator to carry and dispense the granular material, requiring many return trips to refill the hopper, quickly tiring the operator. Alternately, there are spreaders having a pair of wheels positioned at opposed ends of an open hopper for rotatably supporting the hopper. A push/pull bar or handle is connected to the hopper, permitting the spreader wheels to roll over and dispense granular material onto the lawn as a result of the operator walking over the lawn while pushing/pulling the handle. The wheeled spreader can accommodate a larger hopper than a hand-carried/supported spreader, and can incorporate an adjustable dispenser mechanism, typically a spring or cable arrangement adapted for providing an adjustable size opening that is positioned vertically beneath the hopper. However, despite the adjustability of the size of the opening, accurate granular material dispensing may be difficult to achieve, as the dispensing material opening is generally obscured by the hopper itself, making it difficult to visually determine the application rate. Moreover, uneven terrain and/or terrain with closely spaced shrubs or other obstacles, may further complicate the use of the heavy and cumbersome wheeled spreaders.

There is a need for a portable spreader that does not suffer for these drawbacks.

SUMMARY OF THE INVENTION

Applicant has invented an improved portable spreader incorporated in a backpack arrangement that permits use of a relatively large enclosed hopper in combination with a pressurized air source and distribution system that permits accurate placement of granular particles or material, while reducing operator fatigue. Spreaders are commonly used to spread granular material such as seed, weed control pre-emergent, or fertilizer as part of a lawn care, vegetable farming, gardening, and the like, and other applications, including but not limited to granular snow-melt material.

In one embodiment, a portable granular material spreader includes an enclosure having an inlet and an outlet, the enclosure adapted to receive the granular material through the inlet and dispense the granular material from the enclosure through the outlet. The portable granular material spreader further includes a pressurized air source for providing pressurized air. The portable granular material spreader further includes a body having a chamber having a first passageway, a second passageway, and a third passageway, the chamber containing a distributor therein, the first passageway in fluid communication with the outlet to receive the granular material by virtue of gravity from the outlet with the distributor controlling a flow rate of the granular material in the chamber, the second passageway in fluid communication with the pressurized air source, and the third passageway for discharging the granular material entrained in the pressurized air from the pressurized air source, the distributor substantially isolating the first passageway from the second passageway and the third passageway. The portable granular material spreader further includes a conduit having opposed ends, the conduit in fluid communication with the second passageway and the enclosure, the conduit end positioned in the enclosure being sufficiently distal from the enclosure outlet to not result in aerating the granular material proximate the outlet while preventing a reverse flow of the granular material at the enclosure outlet during operation of the spreader.

In another embodiment, a portable granular material spreader includes an enclosure having an inlet and an outlet, the enclosure adapted to receive the granular material through the inlet and dispense the granular material from the enclosure through the outlet. The portable granular material spreader further includes a pressurized air source for providing pressurized air. The portable granular material spreader further includes a body having a chamber having a first passageway, a second passageway, and a third passageway, the chamber containing a distributor therein, the first passageway in fluid communication with the outlet to receive the granular material by virtue of gravity from the outlet with the distributor controlling a flow rate of the granular material in the chamber, the second passageway in fluid communication with the pressurized air source, and the third passageway for discharging the granular material entrained in the pressurized air from the pressurized air source, the distributor substantially isolating the first passageway from the second passageway and the third passageway. The portable granular material spreader further includes a conduit having opposed ends, the conduit in fluid communication with the second passageway and the enclosure, the conduit end positioned in the enclosure being sufficiently distal from the enclosure outlet to not result in aerating the granular material proximate the outlet while preventing a reverse flow of the granular material at the enclosure outlet during operation of the spreader. The portable granular material spreader further includes a wand-type second distributor having a flexible portion connected to the body outlet and terminating at a rigid portion extending to a fitting adapted to distribute the granular material from an end of the rigid portion opposite the flexible portion. The rigid portion further includes a handle including a first control for controlling a flow of pressurized air from the pressurized air source, and a second control for controlling a speed of the distributor, the first control and the second control operating independently from one another.

In yet another embodiment, a portable granular material spreader includes an enclosure having an inlet and an outlet, the enclosure adapted to receive the granular material through the inlet and dispense the granular material from the enclosure through the outlet; The portable granular material spreader further includes a pressurized air source for providing pressurized air. The portable granular material spreader further includes a body having a chamber having a first passageway, a second passageway, and a third passageway, the chamber containing a distributor therein, the first passageway in fluid communication with the outlet to receive the granular material by virtue of gravity from the outlet with the distributor controlling a flow rate of the granular material in the chamber, the second passageway in fluid communication with the pressurized air source, and the third passageway for discharging the granular material entrained in the pressurized air from the pressurized air source, the distributor substantially isolating the first passageway from the second passageway and the third passageway. The portable granular material spreader further includes a conduit having opposed ends, the conduit in fluid communication with the second passageway and the enclosure, the conduit end positioned in the enclosure being sufficiently distal from the enclosure outlet to not result in aerating the granular material proximate the outlet while preventing a reverse flow of the granular material at the enclosure outlet during operation of the spreader. The portable granular material spreader further includes a wand-type second distributor having a flexible portion connected to the body outlet and terminating at a rigid portion extending to a fitting adapted to distribute the granular material from an end of the rigid portion opposite the flexible portion. The rigid portion further includes a handle including a first control for controlling a flow of pressurized air from the pressurized air source, and a second control for controlling a speed of the distributor, the first control and the second control operating independently from one another. The first control and the second control are adapted to be operated with a single hand.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
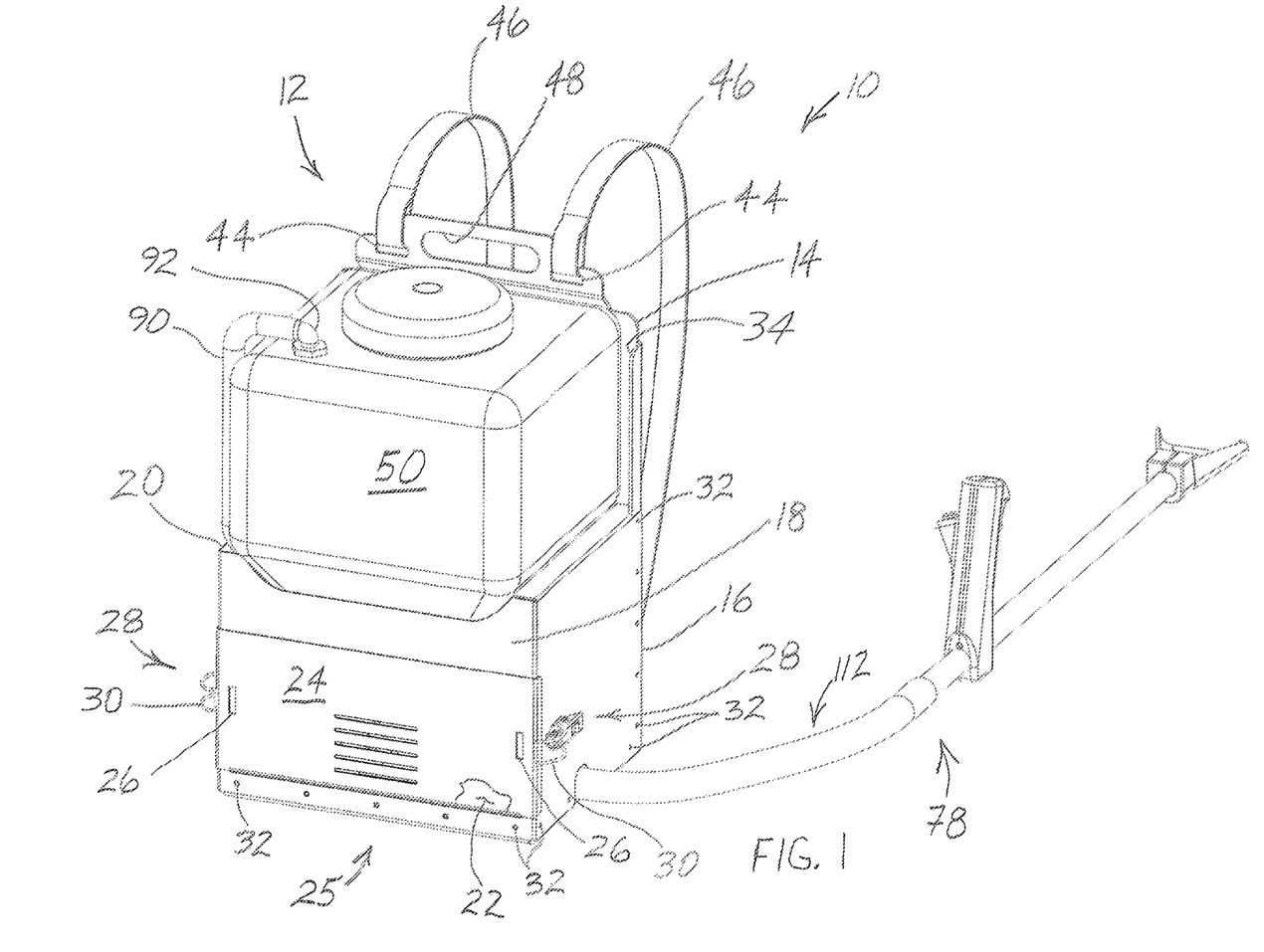
FIG. 1 is an upper perspective view of an exemplary portable granular material spreader.
Figure 2:
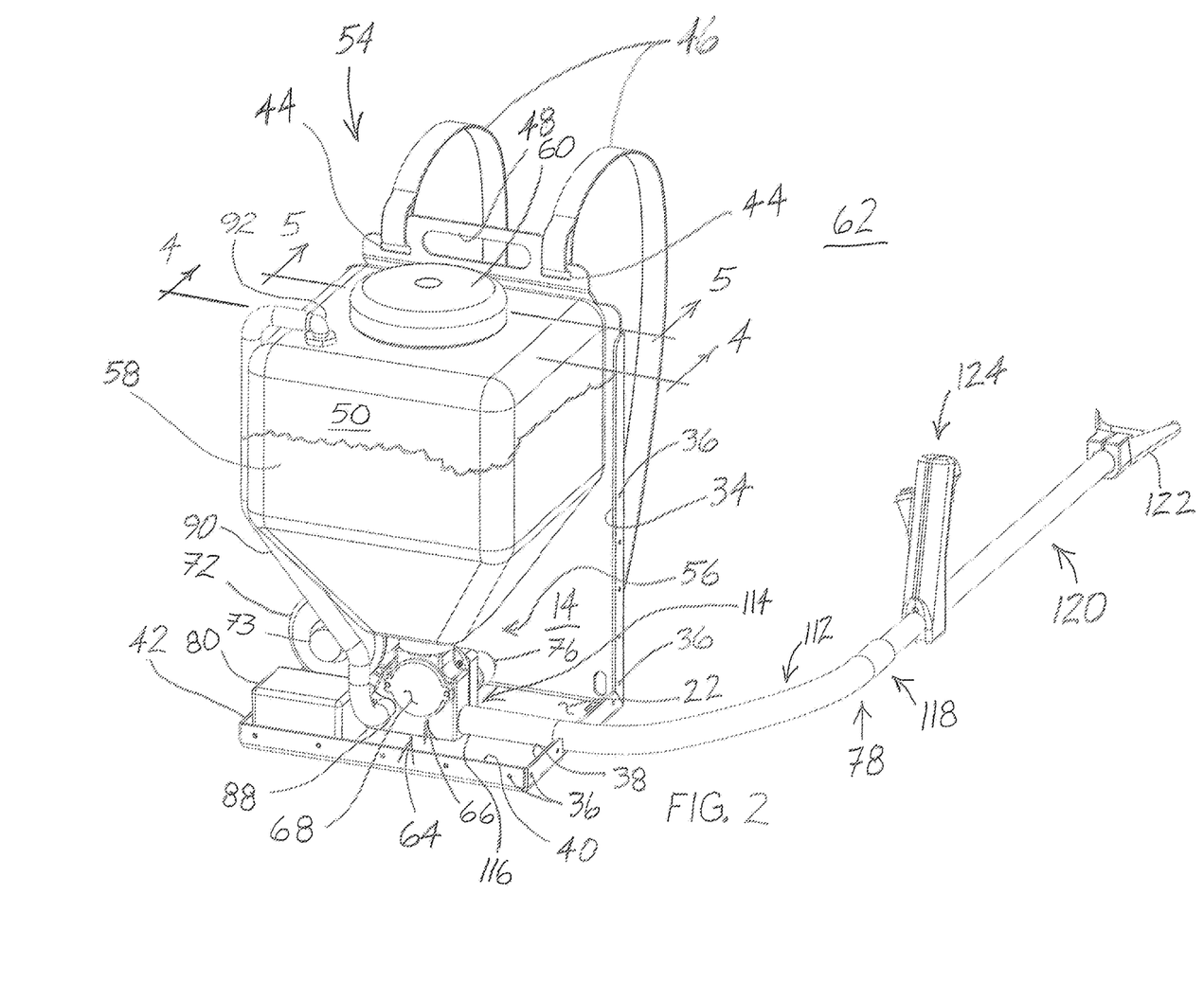
FIG. 2 is a partial upper perspective cutaway view of the material spreader of FIG. 1.
Figure 4:
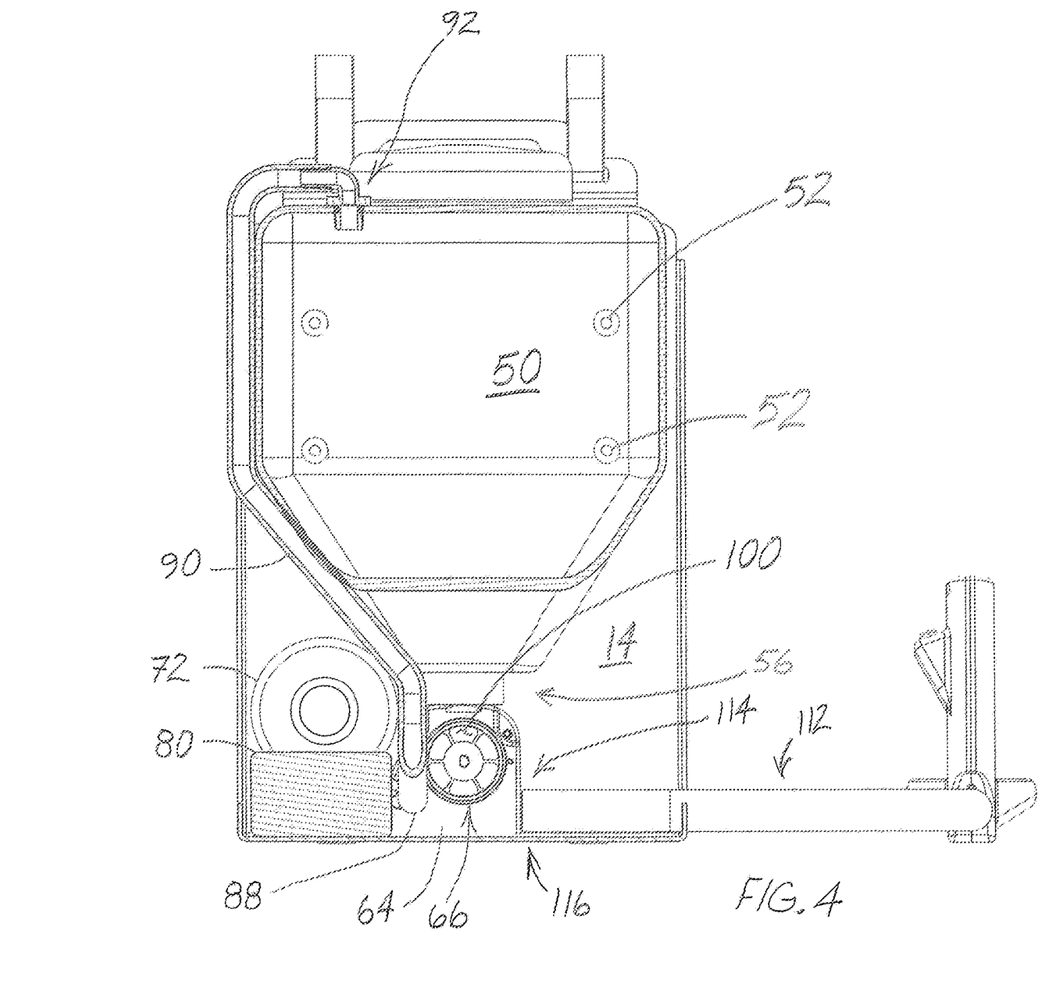
FIG. 4 is a cross section taken along line 4-4 of the material spreader of FIG. 2.

FIG. 1 shows a portable granular particle spreader 10 including a frame 12 having a plurality of interconnected panels 14, 16, 18, 29, 22 which collectively define a compact cubical housing 25 for protecting spreader components therein, as well as forming a peripheral seal at an upper extent with a hopper or enclosure 50 for receiving granular particles therein. As shown, panel 14 of frame 12 includes a stiffening flange 34 providing strength and structural stability for supporting both hopper or enclosure 50 on one side (via fasteners 52 (FIG. 4)) and loops of a pair of shoulder straps 46 on the other side of panel 14, which shoulder straps 46 extending through corresponding slots 44 formed in panel 14, and a slot 48 for permitting the spreader to be lifted from a single hand hold. As further shown, fasteners 32 are utilized to secure panel 16 to flange 34 and 38 (FIG. 2) via openings 36 formed therein, such as threaded openings. Similarly, fasteners 32 may be utilized to secure panel 24 to flange 40 (FIG. 2), as well as securing panel 20 to flange 42 (FIG. 2). As shown, panel 24 is secured over panel 18 by hooks 30 of latches 28 (e.g., over-center latches) engaging corresponding slots formed in panel 24. However, other constructions are also contemplated by the invention. For example, in one embodiment, one or more panels may be formed of a single piece. In one embodiment, one or more panels may be formed as a single piece with the enclosure, such panel 14 and enclosure 50. In one embodiment, fasteners such as latches may be used such that assembly/disassembly of one or more panel(s), up to and including all of the panels may be achieved without tools (i.e., by hands only).

Figure 3:
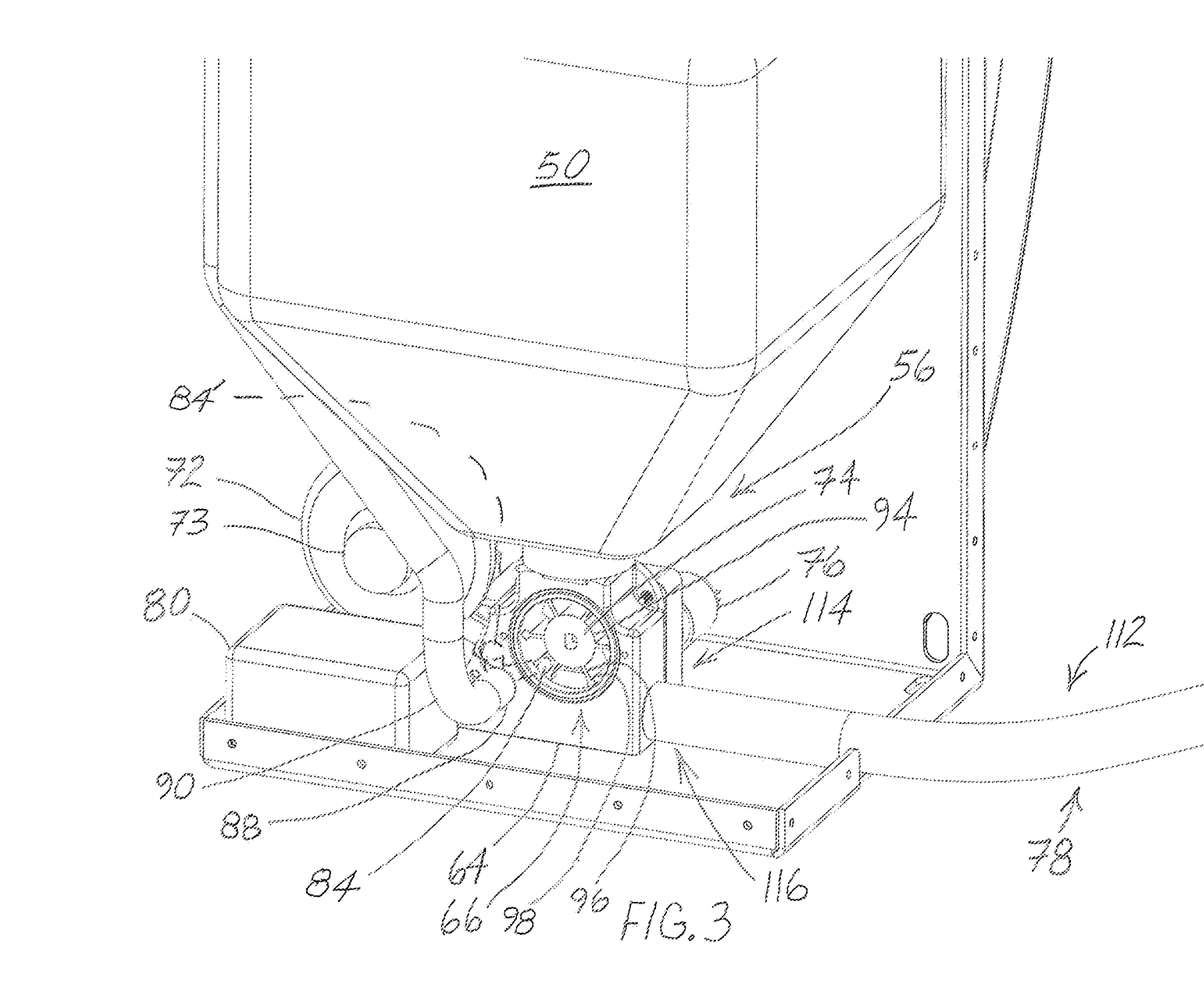
FIG. 3 is an enlarged partial upper perspective cutaway view of the material spreader of FIG. 2.
Figure 5:
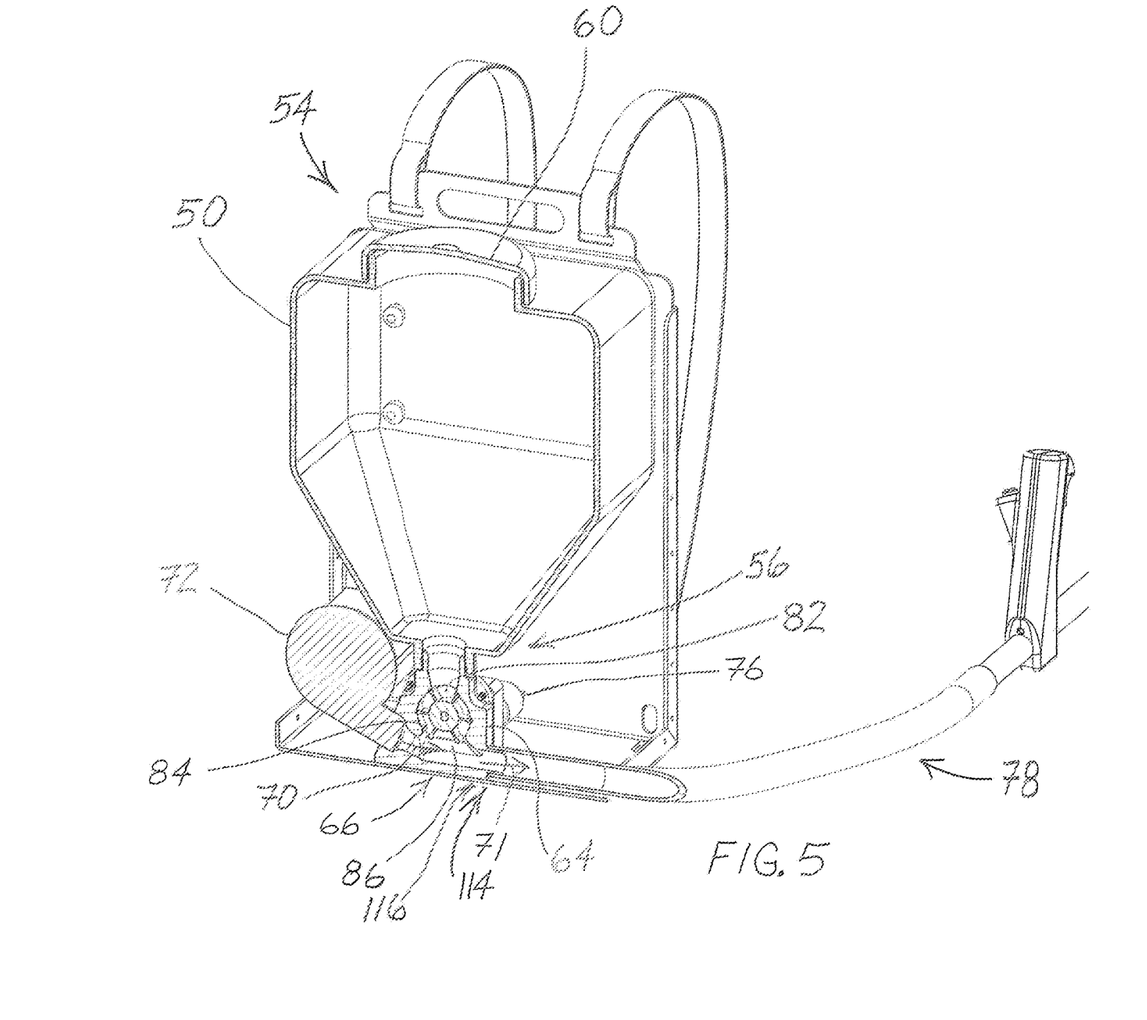
FIG. 5 is a cross section taken along line 5-5 of the material spreader of FIG. 2.

As shown in FIG. 2, enclosure 50 includes an inlet 54 that is vertically above an outlet 56, with inlet 54 adapted to form a substantial fluid tight seal with a lid 60. That is, lid 60 and inlet 54 are generally intended to be sufficiently engaged (e.g., threadedly engaged, possibly in combination with seals such as O rings (not shown)) such as to be sealed from or otherwise impervious to moisture and isolated from the relative atmospheric pressure from a surrounding environment 62 for reasons to be discussed later. Enclosure 50 is adapted to receive granular material 58 through inlet 54 (followed by installing/engaging lid 60 with inlet 54 to establish the desired seal therebetween) and dispense granular material or granular particles 58 by virtue of gravity from enclosure 50 through outlet 56, such as a tapered outlet such as a cone shaped outlet, and into a chamber 66 (in FIG. 2, chamber 66 is positioned behind a cover 68 and is better shown in FIG. 3 (cover 68 is removed from FIG. 3)) formed in a body 64. Granular particles 58 selectively conveyed by a distributor 74 positioned in chamber 66 and urged into driven rotational movement by a motor 76 are entrained or otherwise conveyed from chamber 66 by pressurized air 70 (FIG. 5) from a pressurized air source 72 (FIG. 5) such as a blower, with the particle-laden pressurized air 71 being selectively distributed by the operator (not shown) via a distribution system 78 to be discussed in additional detail below.

Preferably, the granular particles 58 are dry to minimize clumping together.

For purposes herein, the terms "granular particles", "granular material", and the like are intended to refer to a plurality of small, closely packed solid matter in contact with one another that is capable of being controllably distributed, discharged, or otherwise entrained for distribution by a portable pressurized air source.

For purposes herein, the term "portable" is intended to mean is able to be easily carried.

Returning now, collectively, to FIGS. 2-5, body 64 is now discussed. Body 64 includes a generally cylindrical chamber 66 such as a substantially circular cylinder formed therein for rotatably receiving a distributor 74 (FIG. 3) that is selectively urged into rotational movement by a motor 76 (FIG. 3) such as a DC motor powered by a power source 80 (FIG. 3) such as a battery such as a lithium ion battery or other suitable battery or gasoline-powered motor for selectively controlling a flow rate of granular particles 58 (FIG.

2) from outlet 56 of enclosure 50. More specifically, chamber 66 includes passageways 82, 84, 86 extending outwardly therefrom.

More specifically, passageway 82 is in fluid communication with outlet 56 to receive granular particles 58 (FIG. 2) by virtue of gravity from outlet 56 with distributor 74 (FIG. 3) for controlling a flow rate of the granular material into the cylindrical portion of chamber 66. Passageway 84 (which is shown more clearly in FIG. 3 than in FIG. 5) is in fluid communication with pressurized air source 72 and with an end 88 (FIG. 3) of a conduit 90 (FIG. 3) that extends to an opposed end 92 (FIG. 2) positioned in enclosure 50 (FIG. 2) such as near or proximate to an upper portion of enclosure 50 (FIG. 2) such that conduit 90 (FIG. 3) is in fluid communication with both pressurized air source 72 and enclosure 50 (FIG. 2). As a result, even with conduit end 92 (FIG. 2) being positioned in enclosure 50 (FIG. 2) sufficiently distal from enclosure outlet 56 (FIG. 2) so as to not result in aerating granular particles 58 proximate to the enclosure outlet 56 (FIG. 2), by virtue of the enclosure being pressurized by conduit 90 (FIG. 3) to a magnitude at least equal to, if not greater than the pressure magnitude at passageway 82 (FIG. 2), a reverse flow of granular particles 58 at the enclosure outlet 56 (FIG. 2) is preventing during operation of the spreader. Stated another way, the spreader of the present invention is designed to operate without needing to or without regard to agitating the granular particles in the enclosure in close proximity to the enclosure outlet, which in other spreader designs, may be required to operate, or at least to operate as intended. In one embodiment, conduit end 92 (FIG. 2) may be positioned at a location other than an upper portion of enclosure 50 (FIG. 2), although when the spreader is not operating, such alternate positioning may result in a reverse flow of granular particles 58 into conduit 90 by virtue of gravity if the conduit end is vertically positioned below the level of granular particles in the enclosure. Preferably, passageway 84 is in close proximity to pressurized air source 72, permitting the magnitude of static pressure to be maximized.

In one embodiment, as shown in FIG. 2, at least a portion of conduit 90 is a tube extending at least partially exterior of body 64 and enclosure 50. However, in one embodiment, such as by employing additive manufacturing (also referred to as 3D printing) conduit 90 may be at least partially formed integrally (i.e., defining or formed having one piece construction) with at least one of body 64 and enclosure 50.

Returning to FIG. 5, passageway 86 is formed in body 64 for discharging granular material 58 (FIG. 2) entrained in pressurized air 70 from pressurized air source 72. In one embodiment, passageways 84, 86 are in mutual fluid communication with pressurized air source 72. In one embodiment, it may be possible for passageways 84' (FIG. 3) and 86 (FIG. 5) to be independent and separate from one another, while both being in fluid communication with pressurized air source 72. In one embodiment, passageways 84, 86 are in direct, mutual fluid communication via chamber 66, e.g., a direct tee-type connection between passageways 84, 86 and chamber 66.

Returning to FIG. 3, distributor 74 is now discussed. As shown, distributor 74 is formed of a resilient material, and includes a center body 94 having a plurality of arms 96 such as six generally extending radially outward therefrom and generally equally angularly arranged relative to one another about the center body, each arm 96 terminating in an enlarged mass or end 98 and defining a geometric shape such as cylinder such as a ovular cylinder or a circular cylinder that is adapted to form a substantially fluid tight slidable contact with the substantially circular surface portion of chamber 66. In other words, the outer diameter defined or traced by ends 98 is intended to be slightly greater than the diameter of the substantially circular surface of chamber 66, such that ends 98 are maintained in sliding contact with chamber 66. As a result, by virtue of this sliding contact including a sufficient number of arms 96 and corresponding ends 98, and in further combination with the length of the center body and corresponding arms/ends of the distributor similarly being approximately the same, and possibly slightly greater than the depth of the chamber (the distance between cover 68 (FIG. 3) and opposed wall surface 100 (FIG. 4) of the chamber), distributor 74 substantially isolates passageway 82 from passageways 84, 86, thereby acting to reduce pressure fluctuations associated with passageway 82 during operation of the spreader, and thereby further acting to prevent a reverse flow (i.e., backflow) of the granular material at the enclosure outlet during operation of the spreader.

Figure 6:
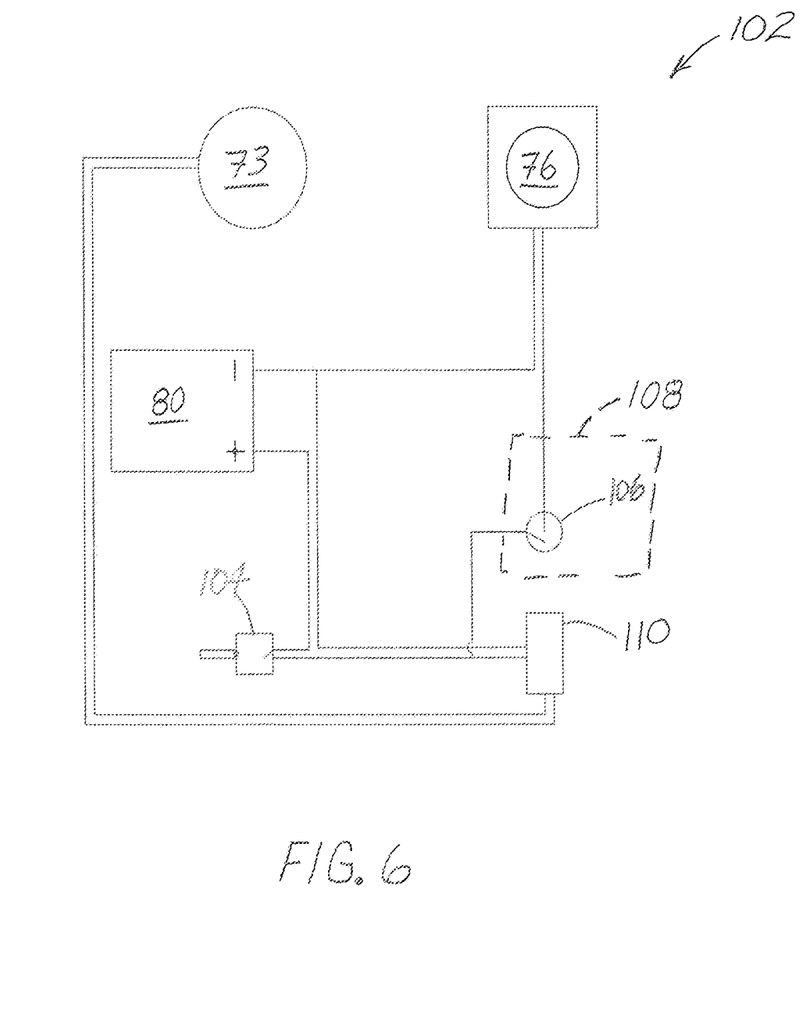
FIG. 6 is a schematic of an exemplary electrical circuit of a material spreader.

FIG. 6 shows an schematic of an exemplary electrical circuit 102 of a material spreader of the present invention, in which power source 80 ((FIG. 3); e.g., a battery) provides electrical power for drivingly actuating a pressurized air source motor 73 for generating pressurized air by the pressurized air source 72 (FIG. 3) for the spreader, and provides electrical power for drivingly actuating motor 76 for drivingly rotating distributor 74 (FIG. 3) for providing granular particles 58 (FIG. 2) to be entrained in the pressurized air 70 (FIG. 5) during operation of the spreader. Electrical power from power source 80 (FIG. 3) may be simultaneously selectively continued/discontinued to motors 73, 76 by actuation of a main power switch 104 such as a toggle switch, and electrical power from power source 80 (FIG. 3) may be selectively continued/discontinued to motor 76 by actuation of a switch 106 such as a toggle switch. Alternately, electrical power from power source 80 (FIG. 3) may be selectively increased/decreased for controlling the speed of motor 76 by actuation of a variable speed switch 108. Similarly, electrical power from power source 80 (FIG. 3) may be selectively increased/decreased for controlling the speed of motor 73 by actuation of a variable speed switch 110.

Returning to FIG. 2, the spreader includes distribution system 78 adapted to distribute the granular material thereby, the distribution system 78 having a flexible portion 112 connected to a body outlet 114 at one end 116 of flexible portion 112, with the opposite end 118 of flexible portion 112 terminating at a rigid portion 120 extending to a fitting 122 adapted to distribute the granular material from an end of the rigid portion opposite the flexible portion. In one embodiment, such as shown in FIG. 7, rigid portion 120 further comprises a handle 124 including a control 126 such as a trigger for controlling a flow of pressurized air from the pressurized air source such as by actuating variable speed switch 110 (FIG. 6) that selectively controls the speed of motor 73 (FIG. 6), and another control 128 such as a button for on/off control of the rotational speed of the distributor 74 such as by actuating switch 106 (FIG. 6) such as a toggle switch (a predetermined rotational speed when on, zero rotational speed when off), controls 126, 128 being adapted to operate independently from one another. It is to be understood that the switch functionality could be reversed in other embodiments. Moreover, it is to be understood by those having ordinary skill in the art that the ergonomic arrangement of handle 124 including controls 126, 128 are adapted to be operated with a single hand. For example, in one embodiment, any combination of either of the controls 126, 218 may be adapted to be actuated or operated by one of the same finger, thumb or portion of the same single hand. That is, in one embodiment, one of controls 126, 128 is operated by one finger of the single hand, a thumb of the single hand, or a portion of the single hand, and the other of the controls 126, 128 is operated by the one finger or a different finger of the single hand, the thumb of the single hand, the portion of the single hand, or a different portion of the single hand.

Figures 7, 8:
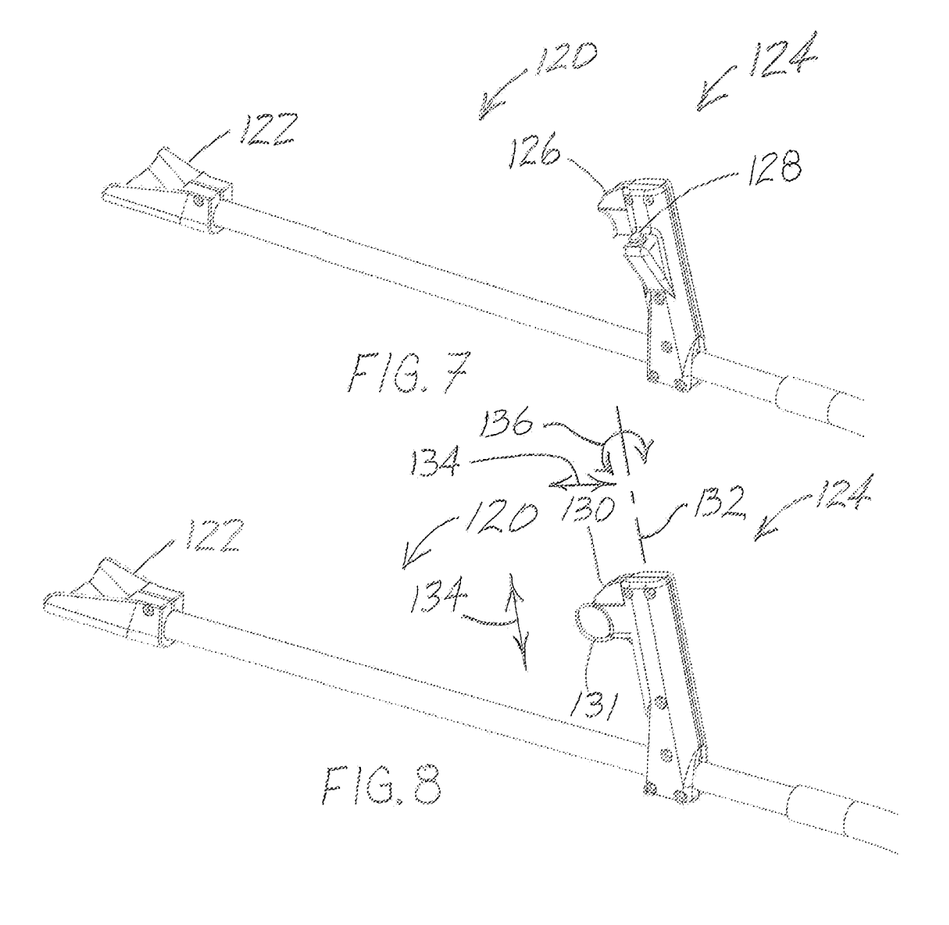
FIG. 7 is a portion of an exemplary distribution system of a material spreader.
FIG. 8 is a portion of an exemplary distribution system of a material spreader.

Alternately, as shown in FIG. 8, handle 124 includes an axis 132 and further includes a single, multi-function control 130 such as a specially configured trigger 131 that is not only adapted for controlling a flow of pressurized air from the pressurized air source such as by actuating variable speed switch 110 (FIG. 6) in actuation directions 134 (e.g., squeezing and releasing trigger 131) that selectively controls the speed of motor 73 (FIG. 6), multi-function control 130 further includes additional actuation directions 136 (control 130/trigger 131 actuates in a direction parallel to axis 132), and/or actuation rotational directions 138 (control 130/trigger 131 rotates about axis 132 in either direction) with each respective actuation directions/rotational directions 136, 138 providing one or both (e.g., on/off in one direction, and variable speed in the other direction) of on/off or variable speed control of the rotational speed of the distributor 74 operating in a similar manner as previously discussed, with each of actuation directions/actuation directions/rotational directions 134, 136, 138 being adapted to operate independently from one another. It is to be understood that the switch functionality could be changed to accommodate any desired operational combination in other embodiments.

In one embodiment, a wand-type distributor has a flexible portion 112 (FIG. 2) connected to body outlet 114 (FIG. 2) and terminating at a rigid portion 120 (FIG. 2) extending to a fitting 122 (FIG. 2) adapted to distribute the granular material from an end of the rigid portion opposite the flexible portion.

It is to be understood that the various descriptions of the embodiments disclosed herein have been simplified to illustrate only those elements, features, and aspects that are relevant to a clear understanding of the disclosed embodiments, while eliminating, for purposes of clarity, other elements, features, and aspects. Persons having ordinary skill in the art, upon considering the present description of the disclosed embodiments, will recognize that other elements and/or features may be desirable in a particular implementation or application of the disclosed embodiments. However, because such other elements and/or features may be readily ascertained and implemented by persons having ordinary skill in the art upon considering the present description of the disclosed embodiments, and are therefore not necessary for a complete understanding of the disclosed embodiments, a description of such elements and/or features is not provided herein. As such, it is to be understood that the description set forth herein is merely exemplary and illustrative of the disclosed embodiments and is not intended to limit the scope of the invention as defined solely by the claims.

In the present disclosure, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the embodiments according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicant reserves the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. .sctn. 112, first paragraph, and 35 U.S.C. .sctn. 132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used in an implementation of the described embodiments.

Any patent, publication, or other disclosure material, in whole or in part, that is said to be incorporated by reference herein, is incorporated herein in its entirety, but only to the extent that the incorporated material does not conflict with existing definitions, statements, or other disclosure material expressly set forth in this disclosure. As such, and to the extent necessary, the express disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:
1. A portable granular material spreader comprising:
   a sealable enclosure having an outlet, the enclosure adapted to dispense the granular material to the enclosure outlet;
   a pressurized air source for providing pressurized air;

a body having a chamber containing a rotatable distributor, the chamber further comprising:
- a first passageway configured to deliver granular material from the enclosure outlet to the chamber;
- a second passageway configured to deliver pressurized air to the chamber; and
- a third passageway configured to discharge granular material entrained in pressurized air from the chamber; and a conduit configured to deliver pressurized air from the pressurized air source to the second passageway and to the enclosure, air pressure delivered to the enclosure being greater than air pressure delivered to the second passageway;

wherein the distributor interface with the chamber is configured to substantially inhibit air flow between the first passageway, the second passageway, and the third passageway when the distributor is not rotating thereby inhibiting dispensing of granular material from the spreader, and to allow air flow between the first passageway, the second passageway, and the third passageway when rotating, allowing controlled discharge of the granular material from the spreader.

2. The portable granular material spreader of claim 1, wherein the distributor is formed of a resilient material.

3. The portable granular material spreader of claim 1, wherein the chamber comprises a circular cylinder adapted to rotatably receive the distributor.

4. The portable granular material spreader of claim 1, wherein the distributor has a center body having a plurality of arms extending radially outwardly from the center body, each arm terminating in an enlarged mass adapted to form a substantially fluid tight slidable contact with a substantially circular surface portion of the chamber.

5. The portable granular material spreader of claim 1, further comprising a frame supporting the enclosure, the frame having a shoulder strap configured to enable the portable granular material spreader to be easily carried by a user.

6. The portable granular material spreader of claim 1, further comprising a distribution system adapted to distribute the granular material thereby, the distribution system having a flexible portion connected to an outlet of the third passageway and terminating at a rigid portion extending to a fitting adapted to distribute the granular material from an end of the rigid portion opposite the flexible portion.

7. The portable granular material spreader of claim 6, wherein the rigid portion further comprises a handle including a first control for controlling a flow of pressurized air from the pressurized air source, and a second control for controlling a speed of the distributor, the first control and the second control operating independently from one another.

8. The portable granular material spreader of claim 7, wherein the first control provides variable control or on/off control of the flow of pressurized air from the pressurized air source, and the second control provides variable speed control or on/off speed control of the distributor.

9. The portable granular material spreader of claim 8, wherein the first control and the second control are adapted to be operated by a single hand.

10. The portable granular material spreader of claim 1, wherein the conduit includes an end fluidly connecting the pressurized air source with the enclosure, the end proximate to an upper portion of the enclosure sufficiently distal from the outlet so as not to result in aeration of the granular material proximate to the outlet.

11. The portable granular material spreader of claim 1, wherein the pressurized air source is drivingly actuated by a first motor and the distributor is drivingly actuated by a second motor.

12. The portable granular material spreader of claim 11, wherein the first motor and the second motor are powered by a battery.

13. A portable granular material spreader comprising:
a sealable enclosure having an outlet, the enclosure adapted to dispense the granular material to the outlet;
a pressurized air source for providing pressurized air;
a body having a chamber containing a rotatable distributor, the chamber further comprising:
- a first passageway configured to deliver granular material from the enclosure outlet to the chamber;
- a second passageway configured to deliver pressurized air to the chamber; and
- a third passageway configured to discharge granular material entrained in pressurized air from the chamber;

a conduit configured to deliver pressurized air from the pressurized air source to the second passageway and to the enclosure, air pressure delivered to the enclosure being greater in magnitude than air pressure delivered to the second passageway; and a wand-type distributor configured to receive granular material entrained in pressurized air from the third passageway and distribute the granular material;

wherein the distributor interface with the chamber is configured to substantially isolate the first passageway from the second passageway and the third passageway when the distributor is not rotating thereby inhibiting granular material flow into the chamber, and to allow air flow between the first passageway, the second passageway, and the third passageway when rotating, enabling gravity-assisted and air-driven delivery of granular material from the enclosure outlet to the enclosure and controlled discharge of the air-entrained granular material from the enclosure to the wand-type distributor.

14. The portable granular material spreader of claim 13, wherein the chamber comprises a circular cylinder adapted to rotatably receive the distributor.

15. The portable granular material spreader of claim 14, wherein the distributor is formed of a resilient material.

16. The portable granular material spreader of claim 13, wherein the distributor has a center body having a plurality of arms extending radially outwardly from the center body, each arm terminating in an enlarged mass adapted to form a substantially fluid tight slidable contact with a substantially circular surface portion of the chamber.

17. The portable granular material spreader of claim 13, wherein the wand-type distributor includes a flexible portion connected to an outlet of the third passageway and terminating at a rigid portion extending to a fitting adapted to distribute the granular material from an end of the rigid portion opposite the flexible portion.

18. The portable granular material spreader of claim 17, wherein the rigid portion further comprises a handle including a first control for controlling a flow of pressurized air from the pressurized air source, and a second control for controlling a speed of the distributor, the first control and the second control operating independently from one another, the first control and the second control being adapted to be operated by a single hand.

19. The portable granular material spreader of claim 13, further comprising a frame supporting the enclosure, the pressurized air source, the body, and the conduit, the frame having a shoulder strap configured to enable the portable granular material spreader to be easily carried by a user.

20. The portable granular material spreader of claim 19, wherein the pressurized air source is drivingly actuated by a first motor and the distributor is drivingly actuated by a second motor, the first and second motors being powered by a frame-supported battery.

* * * * *